Figure 1:
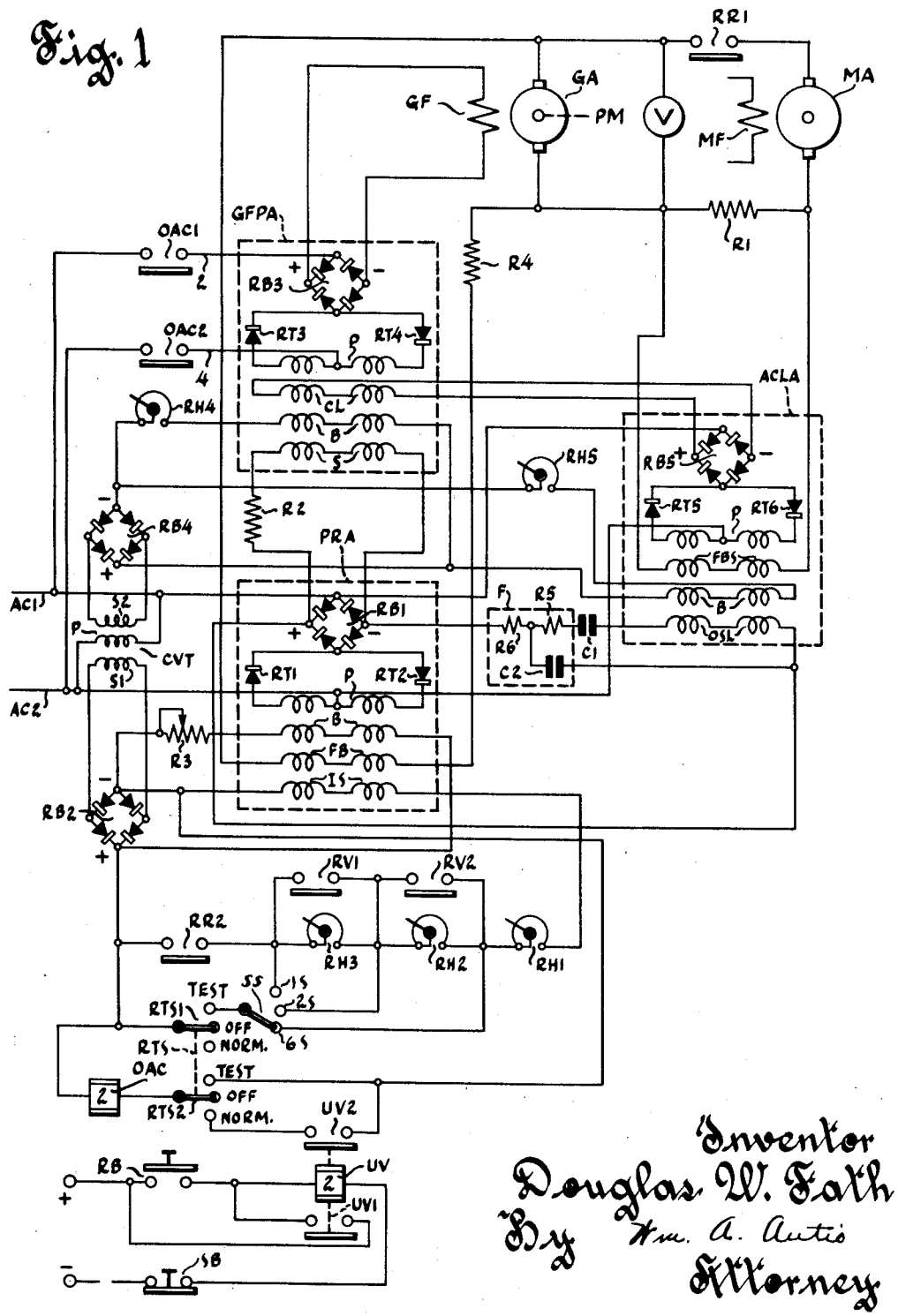

Inventor
Douglas W. Fath
By Wm. A. Autio
Attorney

June 28, 1960  D. W. FATH  2,943,250
MOTOR CONTROL SYSTEM
Filed March 10, 1958  2 Sheets-Sheet 2

Inventor
Douglas W. Fath
By Wm. A. Autis
Attorney

United States Patent Office 2,943,250
Patented June 28, 1960

2,943,250

MOTOR CONTROL SYSTEM

Douglas W. Fath, Brookfield, Wis., assignor to Cutler-Hammer, Inc., Milwaukee, Wis., a corporation of Delaware Filed Mar. 10, 1958, Ser. No. 720,401

8 Claims. (Cl. 318—143)

This invention relates to motor control systems and more particularly to voltage regulator networks for adjustable voltage motor-generator systems.

While not limited thereto, the invention is especially applicable to voltage regulator networks of the magnetic amplifier type having current limit acceleration and deceleration control of a direct current motor employed for operating a skip hoist or the like.

In adjustable voltage systems for controlling motor acceleration in predetermined steps, current limit control is normally provided to prevent excessive current flow in the motor-generator loop during the acceleration periods following the incremental changes in generator field excitation. To this end, a feedback signal proportional to generator armature current is provided to limit the rate of change of generator field excitation. Due to delays in the system networks and in response of the generator to such current limit control, the generator armature voltage increases rapidly to each incremental value. This causes the motor current to overshoot to excessive values creating undesirable conditions dangerous to apparatus during transitory periods between initiation of current limit control and response of the generator armature voltage thereto.

It is therefore a general object of the invention to provide improved means to overcome the aforementioned undesirable conditions.

A more specific object of the invention is to provide improved current limit control means for an adjustable voltage system.

A still more specific object of the invention is to provide such current limit control means with improved current overshoot limit control means effective between initiation of current limit control and response of a controllable device thereto.

Another specific object of the invention is to provide an improved voltage regulator network of the current limit acceleration type for an adjustable voltage system having means to precipitate current limit control.

Another specific object of the invention is to provide a magnetic amplifier type current limiting voltage regulator having improved response whereby to anticipate and initiate current limit control.

Other objects and advantages of the invention will hereinafter appear.

While the apparatus hereinafter described is effectively adapted to fulfill the objects stated, it is to be understood that I do not intend to confine my invention to the particular preferred embodiment of control system disclosed, inasmuch as it is susceptible of various modifications without departing from the scope of the appended claims.

Figure 2:
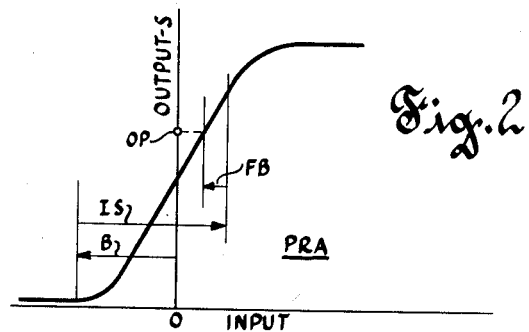
Figure 3:
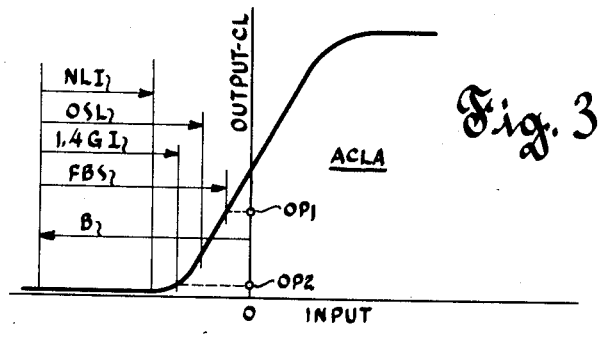
Figure 4:
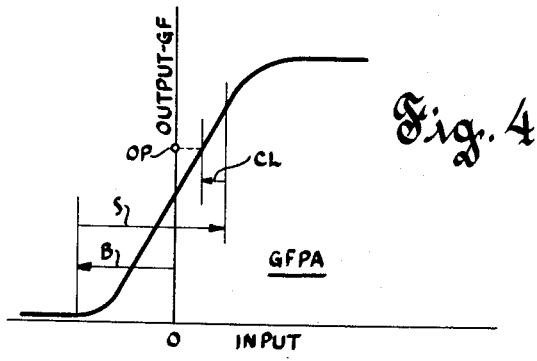

In the drawings,

Figure 1 diagrammatically illustrates a control system constructed in accordance with the invention; and Figs. 2, 3 and 4 graphically depict operating characteristics of certain components of the system of Fig. 1.

In Fig. 1 the relay contacts are related to the relay winding by 1 and 2 suffixed to the relay reference character and the numeral within the winding indicates the number of contacts.

Referring to Fig. 1, there is shown a motor-generator regulator and testing control system wherein a generator mechanically driven by a prime mover PM supplies power to an electrical motor, the latter being employed to drive a skip hoist or the like for charging a blast furnace. The motor is provided with an armature MA and a shunt field winding MF, the latter being energizable from a suitable direct current power supply source. Armature MA is connected in a loop circuit with generator armature GA, normally open run relay contacts RR1 and series armature resistor R1. A voltmeter V is connected across generator armature GA for reasons hereinafter described. Shunt field winding GF of the generator is supplied with power from power supply lines AC1 and AC2 through a pre-amplifier PRA and a generator field power amplifier GFPA, lines AC1 and AC2 being connected to a suitable alternating current power supply source (not shown). An accelerating current limit amplifier ACLA is provided for deriving a signal from series armature resistor R1 and for controlling power amplifier GFPA during motor acceleration. The aforementioned amplifiers are illustrated as being of the magnetic type.

In actual practice, motor armature MA is normally provided with reversing circuits and field winding MF is provided with control resistor circuits. Also a decelerating current limit amplifier is normally provided to limit generator-motor loop current during deceleration. These elements have not been shown to avoid complicating the drawings.

Pre-amplifier PRA is provided with a pair of power windings P, a bias winding B, a feedback winding FB and an input signal winding IS. Power windings P are connected in a well known manner for alternate half-wave energization through respectively associated half-wave rectifiers RT1 and RT2 across power supply lines AC1 and AC2, rectifiers RT1 and RT2 rendering the power windings self-saturating by blocking the desaturating half cycle from each power winding. The energizing circuits of the power windings also are provided with a rectifier bridge RB1 having its input terminals connected to line AC1 and the junction of rectifiers RT1 and RT2, the junction of power windings P being connected to line AC2. The positive and negative output terminals of bridge RB1, these being the output terminals of the pre-amplifier, are connected through a resistor R2 across signal winding S of power amplifier GFPA.

Bias winding B of pre-amplifier PRA is connected through a bias adjusting resistor R3 across the positive and negative output terminals of a rectifier bridge RB2 having its input terminals connected to secondary winding S1 of a constant voltage transformer CVT, the latter having its primary winding P connected for energization across lines AC1 and AC2. Feedback winding FB is connected through resistor R4 across generator armature GA to provide the pre-amplifier with a feedback signal proportional to generator armature voltage. Input signal winding IS is connected in series with rheostats RH1, RH2 and RH3 and normally open run relay contacts RR2, in that order, across the aforementioned negative and positive output terminals of rectifier bridge RB2. Normally open reference voltage contacts RV2 and RV1 are connected across rheostats RH2 and RH3, respectively, for shunting the latter.

A reference voltage test network comprising a reference test selector switch RTS and a speed selector switch SS is provided for testing the output of the regulator without actually running the skip hoist motor thereby to facilitate adjustment of the input signal voltages to the pre-amplifier for a plurality of predetermined motor speeds. Speed selector switch SS may be of the manual type or the like having a movable contact arm and 1S, 2S and 6S designating operating position stationary contacts, the latter being indicative of three predetermined skip hoist speeds. The 6S designating contact is connected to the junction of rheostats RH1 and RH2, the 2S designating contact is connected to the junction of rheostats RH2 and RH3, and the 1S designating contact is connected to the junction of rheostat RH3 and contacts RR2. The reference test selector switch RTS is provided with a pair of contact sets RTS1 and RTS2, each having a movable contact arm mechanically connected to one another, an off position and test and normal designating operating position contacts. The test contact of contact set RTS1 is connected to the movable contact arm of switch SS while the movable contact arm of contact set RTS1 is connected to the positive output terminal of bridge RB2.

The movable contact arm of contact set RTS2 is connected through the operating coil of a power relay OAC to the positive output terminal of bridge RB2, while the test contact thereof is connected directly and the normal contact thereof is connected through normally open contacts UV2 of undervoltage relay UV to the negative output terminal of bridge RB2. The operating coil of relay UV is connected through a normally open reset button switch RB and a normally closed stop button switch SB for energization across a suitable direct current source, normally open contacts UV1 being connected in shunt of switch RB for maintaining energization of the undervoltage relay. The UV relay circuit is normally provided with protective devices as indicated by the broken conductor.

Generator field power amplifier GFPA is provided with a pair of power windings P, a current limit winding CL, a bias winding B and the aforementioned signal winding S. Power windings P are connected for alternate half-wave energization through respectively associated half-wave rectifiers RT3 and RT4 across conductors 2 and 4; the energizing circuits of the power windings also including a rectifier bridge RB3 having its input terminals connected to conductor 2 and the junction of rectifiers RT3 and RT4, and the junction of windings P being connected to conductor 4. Conductors 2 and 4 are connected through normally open contacts OAC1 and OAC2, respectively, to lines AC1 and AC2. The positive and negative output terminals of rectifier bridge RB3, these being the output terminals of the power amplifier, are connected across generator shunt field winding GF.

Current limit winding CL is connected across the output terminals of accelerating current limit amplifier ACLA. Bias winding B of the power amplifier is connected through a bias adjusting rheostat RH4 to the negative and positive output terminals of a rectifier bridge RB4 having its input terminals connected to secondary winding S2 of the aforementioned constant voltage transformer CVT. While two rectifier bridges RB2 and RB4 have been shown for ease of illustration, it will be apparent that a single bridge could be employed in place thereof. The aforementioned signal winding S of the power amplifier is connected to the output terminals of pre-amplifier PRA to connect the amplifiers in series relation.

Accelerating current limit amplifier ACLA is provided with a pair of power windings P, a feedback signal winding FBS, a bias winding B and an overshoot limit winding OSL. Power windings P are connected for alternate half-wave energization through respectively associated half-wave rectifiers RT5 and RT6 across power supply lines AC1 and AC2 in parallel with pre-amplifier PRA. The energizing circuits of the power windings are also provided with a rectifier bridge RB5 having its input terminals connected to line AC1 and the junction of rectifiers RT5 and RT6, the junction of power windings P being connected to line AC2. The positive and negative output terminals of rectifier bridge RB5, these being the output terminals of the current limit amplifier, are connected to the aforementioned current limit winding CL of power amplifier GFPA.

Feedback signal winding FBS is connected across the aforementioned series armature resistor R1 in the motor-generator loop circuit. Bias winding B of amplifier ACLA is connected through a bias adjusting rheostat RH5 to the negative and positive output terminals of rectifier bridge RB4. Overshoot limit winding OSL is connected to the positive output terminal of pre-amplifier PRA and through a capacitor C1 and resistors R5 and R6 of a filter network F in series to the negative output terminal of pre-amplifier PRA. Filter F is also provided with a capacitor C2 connected in shunt of resistor R5, capacitor C1 and overshoot limit winding OSL.

The operation of the regulator and testing control system of Fig. 1 will now be described with reference to the characteristic curves of pre-amplifier PRA, accelerating current limit amplifier ACLA and generator field power amplifier GFPA shown in Figs. 2, 3 and 4, respectively.

Let it be assumed that suitable alternating current power is applied to supply lines AC1 and AC2 and that direct current power is connected to the positive and negative terminals of the undervoltage relay circuit in the lower portion of Fig. 1. As a result, an energizing circuit is established through primary winding P and secondary winding S1 of transformer CVT, rectifier bridge RB2 and resistor R3 to bias winding B of pre-amplifier PRA thereby to bias the amplifier to cut-off as shown by arrow B in Fig. 2. Therefore, although power windings P of the pre-amplifier are connected to lines AC1 and AC2, current does not flow therein. And energizing circuit is also established through secondary winding S2 of transformer CVT, rectifier bridge RB4 and rheostat RH4 to bias winding B of the power amplifier thereby to bias the latter to cut-off as shown by arrow B in Fig. 4. A further energizing circuit is established from the output terminals of rectifier bridge RB4 through rheostat RH5 to bias winding B of accelerating current limit amplifier ACLA thereby to bias the latter beyond cut-off as shown by arrow B in Fig. 3. Let it further be assumed that reference test selector switch RTS is turned to its NORM designating operating position for normal operation of the regulator.

Undervoltage relay UV is energized by momentarily pressing reset button RB to complete a circuit for the operating coil thereof through stop switch SB. Contacts UV1 complete a holding circuit therefor in shunt of switch RB and contacts UV2 complete an energizing circuit from the positive output terminal of rectifier bridge RB2 through the operating coil of power relay OAC, contact set RTS2 and contacts UV2 to the negative output terminal of bridge RB2. Relay OAC energizes and closes contacts OAC1 and OAC2 to connect power windings P of power amplifier GFPA through conductors 2 and 4 to supply lines AC1 and AC2.

To start the motor, run relay contacts RR1 and RR2 are closed. Contacts RR1 connect motor armature MA through resistor R1 across generator armature GA to complete the motor-generator loop circuit. Motor shunt field winding MF is separately excited from a suitable direct current source through field weakening resistors or the like (not shown) so that, when the generator supplies a voltage to the motor as hereinafter described, the latter starts. Contacts RR2 complete an energizing circuit from rectifier bridge RB2 to input signal winding IS through rheostats RH1, RH2 and RH3 in series connection thereby to bias the pre-amplifier on as indicated by arrow IS in Fig. 2.

It will be apparent that the output of pre-amplifier PRA is applied to power amplifier GFPA and that the output of the latter is applied to excite generator field winding GF. As is well known, the generator output voltage is a function of the field flux and the speed and in the motor-generator system the motor speed is a function of the generator output voltage. Therefore, the motor speed is controllable by the magnitude of the pre-amplifier input signal. To this end, the resistance values of rheostats RH1, RH2 and RH3 have been predetermined and adjusted by the movable arms thereof to afford a first increment of motor speed 1S when all three rheostats are in series connection with input signal windings IS, to afford a second increment of motor speed 2S when rheostat RH3 is shunted by contacts RV1, and to afford a third increment of motor speed 6S when rheostat RH2 also is shunted by contacts RV2 so that rheostat RH1 alone remains in the input signal winding circuit.

As hereinbefore described, energization of input signal winding IS biases the pre-amplifier on. As a result, the pre-amplifier affords an amplified output signal which is applied to signal winding S of power amplifier GFPA thereby to bias the latter on as indicated by the arrow S in Fig. 4. The power amplifier in turn affords an amplified output signal to excite generator field winding GF. The generator being driven by a prime mover, the generated output voltage is applied through the loop circuit to start the motor. A signal proportional to the generator armature output voltage is also fed back through resistor R4 to feedback winding FB of the pre-amplifier to oppose input signal winding IS as shown by arrow FB in Fig. 2. Thus, the generator output voltage is regulated in the first instance by balancing reference input signal ampere turns developed in winding IS against generator armature voltage feedback ampere turns developed in winding FB. An increase in reference input signal increases the generator field current and in turn the generator armature voltage. The increase in generator armature voltage is fed back to decrease the output from the pre-amplifier to bias the latter to operating point OP as shown in Fig. 2.

As hereinbefore described, energization of bias winding B of current limit amplifier ACLA biases the latter a predetermined amount beyond cut-off. The current limit amplifier regulates generator armature current during acceleration by balancing bias ampere turns developed in winding B thereof against feedback signal ampere turns developed in winding FBS, the latter ampere turns being proportional to the armature current. To this end, a feedback signal is derived across resistor R1 in the motor-generator loop and applied to feedback signal winding FBS to oppose bias winding B as shown by arrow FBS in Fig. 3. Winding B biases the current limit amplifier well beyond cut-off so that the latter remains in the cut-off condition when normal load armature current is being drawn from the generator as shown by arrow NLI in Fig. 3. The energization of winding B is preferably adjusted by rheostat RH5 so that approximately 140 percent generator current just starts to turn the current limit amplifier on as shown by arrow 1.4GI in Fig. 3, thereby to maintain armature current during acceleration at a safe value as hereinafter described.

The output of current limit amplifier ACLA is applied to the aforementioned current limit winding CL of power amplifier GFPA in a direction to oppose the pre-amplifier output to signal winding S to limit the generator armature current during acceleration to a safe value. When the motor, and the skip hoist driven thereby, is started from rest, an input signal voltage calling for a predetermined voltage from the generator is applied to pre-amplifier PRA. Without the current limit amplifier, the generator voltage would increase rapidly to the predetermined value, causing the motor to draw excessive armature current. With the current limit amplifier in circuit, as soon as the generator voltage increases to a value which causes excessive generator armature current to flow, feedback signal winding FBS turns the current limit amplifier on to operating point OP1 as shown by arrow FBS in Fig. 3. The resultant amplified output which is proportional to the excess armature current is applied to current limit winding CL of the power amplifier to oppose the pre-amplifier output thereto as shown by arrow CL in Fig. 3. As a result, the output of the power amplifier is decreased to operating point OP thereby to decrease the generator armature voltage. In turn, the feedback signal is decreased to a value represented approximately by arrow 1.4GI, thereby to decrease the current limit amplifier output to a value represented by operating point OP2. Thus, the current limit amplifier allows the generator voltage to rise just fast enough to maintain the armature current at a safe value during the acceleration period.

The motor is accelerated to a second incremental speed by closing contacts RV1 to shunt rheostat RH3 and increase the input signal voltage to winding IS a corresponding amount. In like manner, the motor is accelerated to a third incremental speed by closing contacts RV2. After the motor has accelerated to each of the aforementioned incremental speeds, the armature current decreases to the normal running value represented by arrow NLI in Fig. 3 and the current limit amplifier is turned off.

Due to delays in the circuits between the time that the armature current increases to an excessive value and the time that the current limit control comes into play to decrease the armature voltage, the armature voltage tends to overshoot thereby permitting the motor to draw current in excess of a safe value. To prevent this dangerous transitory condition, amplifier ACLA is provided with overshoot limit winding OSL preferably energized from the output terminals of the pre-amplifier, it being apparent that winding OSL could as well be energized from other suitable points in the regulator. Network F filters the pre-amplifier output voltage which is then applied through capacitor C1 to winding OSL. Thus, when the rectified input signal voltage wave turns the pre-amplifier on, a current pulse proportional to the initial rate of change of pre-amplifier output and having a steep wave front from whence it decays in approximately one second is applied to the overshoot limit winding as shown by arrow OSL in Fig. 3. This pulse initiates operation of the current limit amplifier to prevent the armature voltage from overshooting as aforementioned.

To test the output of the voltage regulator without actually running the motor, contacts RR1, RR2, RV1 and RV2 are opened, relay UV is deenergized by momentarily pressing stop switch SB, and reference test selector switch RTS is turned to its TEST designating operating position. Relay OAC is maintained energized through contact set RTS2 to connect power winding P of amplifier GFPA to lines AC1 and AC2.

For exemplary purposes, it may be assumed that the aforementioned three incremental steps of motor speed 1S, 2S and 6S require predetermined values of 100, 200 and 300 armature output volts, respectively. With test selector switch SS in its 6S designating operating position as shown, rheostat RH1 is adjusted so that voltmeter V indicates a generator armature voltage of 300 volts. Next, selector switch SS is turned to its 2S designating operating position and rheostat RH2 is adjusted so that voltmeter V indicates a generator armature voltage of 200 volts. Finally, selector switch SS is turned to its 1S designating operating position and rheostat RH3 is adjusted so that voltmeter V indicates a generator armature voltage of 100 volts. It will be apparent that setting of selector switch SS in operating positions 2S and 6S shunts rheostats RH3 and RH2 to simulate the closure of contacts RV1 and RV2, respectively, under normal operating conditions. The regulator is reset for normal operation by turning selector switch RTS to its NORM designating operating position and resetting the undervoltage relay by pressing switch RB.

The aforementioned testing control system is disclosed and claimed in Douglas W. Fath copending application Serial No. 720,397, filed March 10, 1958.

I claim:

1. In an adjustable voltage motor-generator control system provided with a voltage regulator responsive to predetermined incremental values of input signal for controlling generator field excitation in respectively associated steps thereby to control the motor speed, and current limit control means for controlling the generator armature voltage as a function of the generator armature current whenever the latter exceeds a predetermined value, each increase in input signal causing the generator armature voltage to increase rapidly to the associated incremental value thereby permitting the motor to draw excessive current from the generator armature during a time interval before the current limit control means normally acts to control the generator armature voltage, the improvement comprising means responsive to a change in the input signal for providing a current overshoot limit control signal proportional to such change, and means responsive to said current overshoot limit control signal for rendering said current limit control means operative to control the generator armature voltage during said time interval.

2. In an adjustable voltage motor-generator control system, the combination with a voltage regulator comprising magnetic amplifier means responsive to predetermined incremental values of input signal for controlling generator field energization in corresponding steps thereby to accelerate the motor, and current limit control means comprising a magnetic amplifier responsive to the motor-generator loop current exceeding a predetermined value for controlling said amplifier means thereby to control the generator field energization and armature voltage to limit the loop current to said predetermined value, an incremental change in input signal causing the generator armature voltage to rise rapidly to the corresponding value thereby permitting the motor to draw excessive current from the generator armature for a transient period before the current limit amplifier normally responds to control the generator armature voltage, of means for deriving a current overshoot limit control signal proportional to a change in the input signal from said amplifier means before the motor current reaches an excessive value, and a current overshoot limit winding responsive to said overshoot signal for precipitating the response of said current limit amplifier.

3. In an adjustable voltage motor-generator control system wherein the armature of the motor and generator are connected in a loop circuit and the generator field energization is controlled to adjust the speed of the motor, in combination, a source of input signal adjustable in steps, a pre-amplifier responsive to said input signal for providing an output signal which varies in steps proportional to the steps of said input signal, a power amplifier responsive to the output signal of said pre-amplifier for providing a correspondingly adjustable output signal for energizing the field winding of the generator, a current limit amplifier responsive to the current in the loop circuit for providing an output signal for controlling said power amplifier to adjust the generator field winding energization in proportion to and whenever the current in the loop circuit exceeds a predetermined value, each step of adjustment of said input signal causing the generator armature voltage to change rapidly to the new value thereby permitting the motor current to become excessive during a time interval before said current limit amplifier and said power amplifier normally function to control the change in generator armature voltage, means responsive to said input signal for providing a current over-shoot limit control signal which is a function of the rate of change of said input signal, and means responsive to said current overshoot limit control signal for causing said current limit amplifier to provide an output signal for controlling said power amplifier to regulate the rate of change of generator field energization during said time interval.

4. The invention defined in claim 3, wherein said current limit amplifier is a magnetic amplifier provided with an overshoot limit winding for controlling the output thereof during said time interval, and the output signal of said pre-amplifier is connected to said overshoot limit winding.

5. The invention defined in claim 3, wherein said current limit amplifier is a magnetic amplifier having an overshoot limit winding for controlling the output thereof during said time interval, and said means for providing a current overshoot limit control signal comprises a capacitor connecting the output signal of said pre-amplifier to said overshoot limit winding.

6. In an adjustable voltage motor-generator control system wherein the armatures of the motor and generator are connected in a loop circuit and the generator field energization is controlled to adjust the speed of the motor, in combination, an alternating current source, means connected to said source for providing an input signal adjustable in steps, a magnetic pre-amplifier connected to said source and responsive to said input signal for providing a control signal which varies in steps in accordance with the steps of said input signal, a magnetic power amplifier connected to said source and responsive to said control signal for providing a correspondingly adjustable output current for energizing the field winding of the generator, a current limit magnetic amplifier connected to said source and responsive to the current in the loop circuit for providing an output signal for controlling said power amplifier to adjust the generator field winding energization whenever the current in the loop circuit exceeds a predetermined adjustable value, each step of adjustment of said input signal causing the generator armature voltage to change rapidly to a new value thereby permitting the motor current to become excessive during a time interval before said current limit amplifier and said power amplifier normally function to control the rate of change in generator armature voltage, means responsive to each step of change in said input signal for providing a current overshoot limit control signal pulse, and a control winding in said current limit amplifier responsive to said pulse for causing the latter to provide an output signal for controlling said power amplifier in a direction to regulate the rate of change of generator field energization during said time interval.

7. The invention defined in claim 6, wherein said means for providing said pulse comprises a capacitor connected between a point in the input circuit of the system and said control winding.

8. The invention defined in claim 7, wherein said pulse is proportional to the initial rate of change of current in said input circuit and has a steep wave front from whence it decays in a predetermined time interval, together with a filter in series with said capacitor.

References Cited in the file of this patent

UNITED STATES PATENTS

| | | |
|---|---|---|
| 2,743,151 | Hunt et al. | Apr. 24, 1956 |
| 2,848,673 | Pettit et al. | Aug. 19, 1958 |
| 2,853,668 | Moore | Sept. 23, 1958 |